United States Patent
Kita et al.

(10) Patent No.: US 12,545,584 B2
(45) Date of Patent: *Feb. 10, 2026

(54) PROCESS FOR THE REMOVAL OF HEAVY METALS FROM A PHOSPHORIC ACID CONTAINING COMPOSITION USING AN IONIC POLYMERIC SURFACTANT AND USE OF SAID SURFACTANT IN THE PRECIPITATION OF HEAVY METALS IN A PHOSPHORIC ACID CONTAINING COMPOSITION

(71) Applicant: Yara International ASA, Oslo (NO)

(72) Inventors: Patrycja Kita, Poznan (PL); Tanja Vojnovic, Skien (NO); Katrine Lie Bøyesen, Skien (NO)

(73) Assignee: YARA INTERNATIONAL ASA, Oslo (NO)

( * ) Notice: Subject to any disclaimer, the term of this patent is extended or adjusted under 35 U.S.C. 154(b) by 449 days.

This patent is subject to a terminal disclaimer.

(21) Appl. No.: 18/008,880

(22) PCT Filed: Jun. 16, 2021

(86) PCT No.: PCT/EP2021/066246
§ 371 (c)(1),
(2) Date: Dec. 7, 2022

(87) PCT Pub. No.: WO2021/255097
PCT Pub. Date: Dec. 23, 2021

(65) Prior Publication Data
US 2023/0234847 A1      Jul. 27, 2023

(30) Foreign Application Priority Data

Jun. 16, 2020   (EP) ..................................... 20180341
Sep. 8, 2020    (EP) ..................................... 20195110

(51) Int. Cl.
*C01B 25/238*   (2006.01)
*B01D 21/01*    (2006.01)
(Continued)

(52) U.S. Cl.
CPC ............ *C01B 25/238* (2013.01); *B01D 21/01* (2013.01); *B09B 3/70* (2022.01); *C02F 1/56* (2013.01);
(Continued)

(58) Field of Classification Search
None
See application file for complete search history.

(56) References Cited

U.S. PATENT DOCUMENTS 4,308,214 A    12/1981   Robertson
4,334,074 A     6/1982   Peterson
(Continued)

FOREIGN PATENT DOCUMENTS

CN    1036745    11/1989
CN    1109025     9/1995
(Continued)

OTHER PUBLICATIONS

Machine translation of WO-2014038537-A1, pp. 1-14. (Year: 2014).*
(Continued)

*Primary Examiner* — Clare M Perrin
(74) *Attorney, Agent, or Firm* — DILWORTH IP, LLC (57) ABSTRACT

Improved methods for the removal of heavy metals, in particular cadmium, from an aqueous phosphoric acid containing composition, wherein an organothiophosphorous heavy metal precipitating agent and an ionic polymeric surfactant, particularly a cationic polyacrylamide copolymer surfactant, are both added to a phosphoric acid containing composition, particularly under vigorous mixing conditions, such as between 500 and 700 rpm. The ionic polymeric
(Continued)

ADJUSTMENT OF THE pH OF A PHOSPHORIC ACID CONTAINING COMPOSITION
(pH 1.6-2.2 measured after a 13-fold dilution by volume using water)

ADDITION OF PRECIPITATING AGENT + IONIC POLYMERIC SURFACTANT
(under vigorous mixing)

SEPARATION OF PRECIPITATE/AGGLOMERATE
FROM FILTRATE/SUPERNATANT surfactant promotes the precipitation of the heavy metals. More in particular, the phosphoric acid containing composition is obtained by the acid digestion of phosphate rock, preferably by nitric acid, sulfuric acid, or a combination thereof.

20 Claims, 3 Drawing Sheets

(51) Int. Cl.
| | |
|---|---|
| B09B 3/70 | (2022.01) |
| C02F 1/56 | (2023.01) |
| C02F 1/68 | (2023.01) |
| C02F 11/14 | (2019.01) |
| C22B 3/26 | (2006.01) |
| C22B 3/38 | (2006.01) |
| B03D 3/06 | (2006.01) |
| C02F 1/66 | (2023.01) |
| C02F 9/00 | (2023.01) |
| C02F 101/20 | (2006.01) |
| C02F 103/10 | (2006.01) |
| C05B 11/06 | (2006.01) |

(52) U.S. Cl.
CPC ............ *C02F 1/683* (2013.01); *C02F 11/14* (2013.01); *C22B 3/26* (2021.05); *C22B 3/382* (2021.05); *B03D 3/06* (2013.01); *C01P 2006/80* (2013.01); *C02F 1/66* (2013.01); *C02F 9/00* (2013.01); *C02F 2101/20* (2013.01); *C02F 2103/10* (2013.01); *C02F 2209/06* (2013.01); *C05B 11/06* (2013.01)

(56) References Cited

U.S. PATENT DOCUMENTS

| | | | | |
|---|---|---|---|---|
| 4,378,340 | A | | 3/1983 | Berglund |
| 4,437,997 | A | * | 3/1984 | Dobry ................... C01B 25/405 |
| | | | | 71/36 |
| 4,479,924 | A | * | 10/1984 | von Plessen ......... C01G 21/003 |
| | | | | 423/100 |
| 4,584,111 | A | | 4/1986 | Collett |
| 4,634,580 | A | | 1/1987 | Jdid |
| 4,762,693 | A | | 8/1988 | Schimmel |
| 4,986,970 | A | * | 1/1991 | Haraldsen ............... C22B 17/04 |
| | | | | 423/321.1 |
| 5,173,280 | A | | 12/1992 | Rey |
| 5,378,262 | A | | 1/1995 | Mihaylov et al. |
| 5,656,175 | A | | 8/1997 | Bossier |
| 2004/0136889 | A1 | | 7/2004 | Bonath |
| 2004/0179984 | A1 | | 9/2004 | Nagaraj |
| 2012/0193296 | A1 | | 8/2012 | Bhaduri |
| 2019/0106324 | A1 | * | 4/2019 | Zhang ................... C01B 25/238 |

FOREIGN PATENT DOCUMENTS

| | | | |
|---|---|---|---|
| CN | 1109913 | A | 10/1995 |
| CN | 101560004 | | 10/2009 |
| CN | 104478060 | | 4/2015 |
| CN | 105944451 | | 9/2016 |
| CN | 206624725 | | 11/2017 |
| CN | 109205846 | | 1/2019 |
| DE | 3209183 | A1 | 9/1983 |
| DE | 3502215 | | 7/1986 |
| EP | 0039119 | | 11/1981 |
| EP | 0091043 | A1 | 10/1983 |
| FI | 830270 | | 7/1983 |
| FR | 2870229 | | 11/2005 |
| RU | 2386592 | C2 | 4/2010 |
| WO | 8908075 | | 9/1989 |
| WO | 2004083118 | | 9/2004 |
| WO | 2011154991 | | 12/2011 |
| WO | WO-2014038537 | A1 * | 3/2014 ............... C02F 1/56 |
| WO | 2019071108 | | 4/2019 |

OTHER PUBLICATIONS

International Preliminary Report on Patentability issued in App. No. PCT/EP2021/066244, mailing date Apr. 8, 2022, 16 pages.
International Search Report and Written Opinion issued in App. No. PCT/EP2021/066244, mailing date Oct. 6, 2021, 13 pages.
International Search Report and Written Opinion issued in App. No. PCT/EP2021/066246, mailing date Oct. 6, 2021, 12 bages.
Swe Swe Mar & Masanori Okazaki, Microchemical Journal 104 (17-21), Sep. 2012.
International Search Report and Written Opinion issued in App. No. PCT/EP2021/066174, mailing date Oct. 13, 2021, 12 pages.
International Preliminary Report on Patentability issued in App. No. PCT/EP2021/066179, mailing date Mar. 16, 2022, 14 pages.
Office Action (including English translation) issued in App. No. EA20229299328, dated May 20, 2024, 10 pages.
English translation of Chinese Office Action issued in App. No. CN202180028835, dated Sep. 8, 2023, 17 pages.
English Abstract of EP0085344 (A2), corresponding to FI 830270, Hoechst AG.
Xu Zhaoxi, Heavy metal removal by wet phosphoric acid precipitation method, Inorganic Salt Industry, No. 02, Apr. 20, 1989, 4 pages.
He Zhiru, Li Ning, Research on wastewater treatment technology for storage battery production, Environmental Science and Management, No. 12, Dec. 15, 2011.
English translation of Chinese Office Action issued in App. No. CN202180028802, dated Sep. 8, 2023, 18 pages.
Chinese Office Action (including English translation) issued in App. No. CN202180028835, dated Jan. 13, 2024, 26 pages.
English translation of Chinese Office Action issued in App. No. CN202180028802, dated Jan. 11, 2024, 15 pages.
English translation of Chinese Office Action issued in App. No. CN202180034830, dated Jan. 17, 2024, 13 pages.
Jing et al., "Port Environmental Pollution Control Technology", Ocean Press, Nov. 30, 2007, 4 pages.
Office Action and Search Report received for Chinese Application No. 202180034903, mailed on Feb. 15, 2025, 18 pages (8 pages of original office action and 10 pages of English Translation).

* cited by examiner

ADJUSTMENT OF THE pH OF A PHOSPHORIC ACID CONTAINING COMPOSITION (pH 1.6-2.2 measured after a 13-fold dilution by volume using water)

ADDITION OF PRECIPITATING AGENT + IONIC POLYMERIC SURFACTANT (under vigorous mixing)

SEPARATION OF PRECIPITATE/AGGLOMERATE

FROM FILTRATE/SUPERNATANT

FIG. 1

ADJUSTMENT OF THE pH OF A PHOSPHORIC ACID CONTAINING COMPOSITION (pH 1.6-2.2 measured after a 13-fold dilution by volume using water)

REMOVAL OF SLUDGE/INSOLUBLE FRACTION

ADDITION OF PRECIPITATING AGENT + IONIC POLYMERIC SURFACTANT (under vigorous mixing)

SEPARATION OF PRECIPITATE/AGGLOMERATE FROM FILTRATE/SUPERNATANT

FIG. 2

```
┌─────────────────────────────────────────────────────────────────┐
│   ADJUSTMENT OF THE pH OF A PHOSPHORIC ACID CONTAINING          │
│                        COMPOSITION                              │
│   (pH 1.6-2.2 measured after a 13-fold dilution by volume using water) │
└─────────────────────────────────────────────────────────────────┘
                              ⇩
┌─────────────────────────────────────────────────────────────────┐
│              ADDITION OF A FLOCCULATING AGENT                   │
│                     (under gentle mixing)                       │
└─────────────────────────────────────────────────────────────────┘
                              ⇩
┌─────────────────────────────────────────────────────────────────┐
│           REMOVAL OF SLUDGE/INSOLUBLE FRACTION                  │
│             (by settling and/or centrifugation)                 │
└─────────────────────────────────────────────────────────────────┘
                              ⇩
┌─────────────────────────────────────────────────────────────────┐
│  ADDITION OF PRECIPITATING AGENT + IONIC POLYMERIC SURFACTANT   │
│                    (under vigorous mixing)                      │
└─────────────────────────────────────────────────────────────────┘
                              ⇩
┌─────────────────────────────────────────────────────────────────┐
│          SEPARATION OF PRECIPITATE/AGGLOMERATE                  │
│              FROM FILTRATE/SUPERNATANT                          │
└─────────────────────────────────────────────────────────────────┘
```

FIG. 3

PROCESS FOR THE REMOVAL OF HEAVY METALS FROM A PHOSPHORIC ACID CONTAINING COMPOSITION USING AN IONIC POLYMERIC SURFACTANT AND USE OF SAID SURFACTANT IN THE PRECIPITATION OF HEAVY METALS IN A PHOSPHORIC ACID CONTAINING COMPOSITION

FIELD

The present disclosure relates to the field of removing heavy metal ions, including but not limited to cadmium, from wet-process acidic compositions. More in particular, the present disclosure relates to removing heavy metal ions, such as cadmium, from phosphoric acid containing process streams.

BACKGROUND

Heavy metals such as cadmium, copper, nickel, lead, zinc and mercury are considered unacceptable above a certain level, depending on the application, because of their toxicity and they thus have to be either completely removed or their levels have to be reduced significantly. Many processes have been developed over the years for their removal.

In this context, the phosphate rock extracted from phosphate mines typically contains heavy metal impurities, such as cadmium, copper, arsenic, or mercury. For instance, cadmium typically is present at levels between 0.15 to 507 mg/kg of phosphate rock having an average phosphorous ($P_2O_5$) content of about 30 weight % (Swe Swe Mar & Masanori Okazaki, Microchemical Journal 104 (17-21), September 2012). Unless the heavy metals are removed from the phosphate rock prior to or during its digestion with acid, such as prior to or during the nitro-phosphate process, the resulting phosphate-based products and fertilizers will contain cadmium and other heavy metals. Some forms of heavy metals, such as cadmium, can be taken up by plants and, thereby, end up in the food chain. For instance, cadmium can cause damage to lungs, kidneys, and bones. Therefore, it is essential to limit the level of heavy metals, such as cadmium, in fertilizers. The European Union is now considering a limit of 60 mg cadmium per kilogram of phosphorous (expressed as $P_2O_5$). However, Finland is applying an even lower limit such as 21.5 mg of cadmium per kilogram of $P_2O_5$. The level of the heavy metal impurities thus has to be significantly reduced.

The precipitation of heavy metals, such as cadmium, in the nitro-phosphate process or in other processes comprising the acid digestion of phosphate rock, has previously been reported.

U.S. Pat. No. 4,378,340 discloses a method of removing heavy metals from an acid digest of phosphate rock by partial neutralization of the acids followed by precipitation of the heavy metals as sulphides.

U.S. Pat. No. 4,986,970 discloses a method for removal of heavy metals, especially cadmium, primarily from a mother liquor made by the Odda process, using metal salts of dithiocarbonic acid-O-esters, referred to as xanthates, at a pH ranging from 1.4 and 2.0 and at temperatures ranging from 5 to 40° C.

US 2004/0179984 discloses a process and compositions to remove heavy metal ions, such as cadmium, copper, lead, nickel, arsenic, manganese, zinc, and mercury ions from the wet phosphoric acid process. The process involves treating phosphoric acid prior to or after gypsum filtration with diorgano-dithiophosphinic acid (or alkali metal or ammonia salts thereof), a first diorgano-dithiophosphoric acid (or alkali metal or ammonia salts thereof) and optionally a second diorgano-dithiophosphoric acid (or alkali metal or ammonia salts thereof), precipitating metals such as cadmium, copper, lead, nickel, arsenic, manganese, zinc and mercury at a temperature from about 10 to about 85° C. and preferably in the range of about 50 to about 80° C., and separating the filtrate by either filtration or flotation. In this context, the examples only indicate that these compounds are effective in phosphoric acid, in particular at temperatures ranging from 60 to 80° C.

EP 0091043 discloses the use of similar heavy metal removal agents as disclosed in US20040179984 for the removal of cadmium by precipitation from the Odda process.

WO2019071108 discloses the simultaneous use of organothiophosphorous compounds and surfactants, in particular sulfosuccinate compounds and polyethyleneglycol esters for removing heavy metal ions from aqueous solutions containing phosphoric acid, in particular in various stages of wet process phosphoric acid production.

Nevertheless, despite the various approaches of the prior art, the removal of heavy metals, such as cadmium, from a phosphate rock digest by concentrated acid, such as nitric acid, remains challenging due to the very acidic and oxidizing conditions in the liquor, and the presence of calcium, which may affect heavy metal precipitation as well. In addition, heavy metal contamination, especially cadmium, remains a concern to public health. In this context, as indicated above, regulatory agencies continue to impose lower limits on the acceptable level of heavy metals, in particular cadmium. There thus remains a need for improved methods for the efficient removal of heavy metals, such as cadmium, from phosphoric acid containing compositions.

SUMMARY

The present disclosure provides improved methods for the removal of heavy metals, in particular cadmium, from an aqueous phosphoric acid containing composition, which address the above identified needs in the art. In the improved methods of the present disclosure, the heavy metals are precipitated by adding an organothiophosphorous heavy metal precipitating agent in combination with an ionic polymeric surfactant to the aqueous phosphoric acid containing composition.

Advantageously, the combination of an organothiophosphorous heavy metal precipitating agent and an ionic polymeric surfactant, particularly a cationic poly(meth)acrylamide copolymer surfactant, led to an efficient precipitation and removal of the heavy metal from the phosphoric acid containing composition. The methods of the present disclosure are particularly suited for the removal of heavy metals, such as cadmium, from an aqueous composition of the nitro-phosphate process, comprising both phosphoric acid and nitric acid, without hydrogen sulphide or NOx formation resulting from side reactions of the heavy metal precipitating agent.

According to one aspect of the present disclosure, a method is disclosed for the removal of heavy metals, in particular cadmium, dissolved in a phosphoric acid containing composition, comprising the steps of
  (a) providing a phosphoric acid containing composition comprising dissolved heavy metals, such as cadmium;
  (b) precipitating the dissolved heavy metals by adding a heavy metal precipitating agent and a surfactant to the composition of step (a), at a pH of at least 1.6, measured after a 13-fold dilution by volume using water, thereby obtaining a heavy metal precipitate in a phosphoric acid containing composition, wherein the heavy metal precipitating agent comprises a diorgano-dithiophosphinic acid or an alkali metal or ammonia salt thereof, represented by Formula 1

Formula 1 wherein R is a linear or branched hydrocarbon group selected from alkyl, aryl, alkylaryl, or aralkyl, and wherein the hydrocarbon group contains 3 to 20 carbon atoms, and M is H, alkali metal or ammonia; and (c) separating the heavy metal precipitate from the phosphoric acid containing composition obtained in step (b);

wherein the surfactant is a cationic polymeric surfactant wherein from 20% to 80%, more particularly from 20% to 60%, even more particularly from 20% to 50% of the moieties making up the cationic polymeric surfactant are cationic charged moieties, an anionic polymeric surfactant wherein from 1% to 10% of the moieties making up the anionic polymeric surfactant are anionic charged moieties, or a mixture thereof.

According to an embodiment of the present disclosure, the surfactant is a cationic polyacrylamide or a cationic polymethacrylamide, with a cationic charge ranging from 20% to 80%, particularly ranging from 20% to 60% or 20% to 50% or from 30% to 50%, more particularly ranging from 35% to 45%.

According to an embodiment of the present disclosure, the surfactant is a copolymer of (meth)acrylamide, particularly a copolymer of (meth)acrylamide and a chloro-methylated monomer, such as dimethylaminoethyl (meth)acrylate.

According to an embodiment of the present disclosure, the molecular weight (MW) of the polymeric surfactant agent ranges from $3 \times 10^6$ to $14 \times 10^6$ Dalton.

According to an embodiment of the present disclosure, the surfactant agent is added in a dose of 5 to 30 g/m³ acid composition, particularly in a dose of 5 to 20 g/m³ acid composition or 10 to 20 g/m³ acid composition.

According to an embodiment of the present disclosure, the ratio of precipitating agent to surfactant ranges from 1:1 to 10:1, particularly ranges from 3:1 to 6:1.

According to an embodiment of the present disclosure, R in Formula 1 is selected from the group consisting of cyclohexyl, isopropyl, isobutyl, n-propyl, octyl, hexyl, phenylethyl and 2,4,4-trimethylpentyl, particularly wherein the heavy metal-precipitation agent is sodium diisobutyldithiophosphinate. Advantageously, precipitating agents according to Formula 1 have a good cadmium extraction efficacy and are less hazardous compared to inorganic sulphides and xanthates. In particular, precipitating agents according to Formula 1 result in lower (if any) $H_2S$, COS or $CS_2$ emissions compared to inorganic sulphides and xanthates.

According to an embodiment of the present disclosure, step (a) further comprises the steps of (i) adjusting the pH of a phosphoric acid containing composition comprising dissolved heavy metals to a pH of at least pH 1.6 measured after a 13-fold dilution by volume using water, such as a pH of 1.6 to 2.2 measured after a 13-fold dilution by volume using water, particularly by addition of ammonia; thereby obtaining a phosphoric acid containing composition comprising a sludge fraction;

(ii) optionally adding a first flocculating agent, such as a cationic polymeric flocculating agent, an anionic polymeric flocculating agent, or a mixture thereof, to the composition of step (i);

(iii) separating the sludge fraction from the composition of step (i) or (ii).

According to an embodiment of the present disclosure, step (c) comprises the steps of (c1) adding a second flocculating agent, in particular a cationic polymeric flocculating agent, an anionic flocculating agent, or a mixture thereof, to the composition obtained in step (b), thereby obtaining agglomerates comprising the heavy metal precipitate in a phosphoric acid composition; and (c2) separating the agglomerates comprising the heavy metal precipitate from the phosphoric acid containing composition.

According to an embodiment of the present disclosure, the phosphoric acid containing composition is an acid digest of phosphate rock, preferably by nitric acid, sulfuric acid, or a mixture thereof. More in particular, the phosphoric acid containing composition is an acidic aqueous composition comprising from 6-21 wt % nitric acid, from 25 to 33 wt % phosphoric acid, from 3.5 to 5 wt % calcium and dissolved heavy metals, such as cadmium, with wt % being based on the total weight of the composition.

Accordingly, in an embodiment of the present disclosure the heavy metals are selected from cadmium, copper, nickel, lead, zinc and/or mercury; preferably the heavy metals are cadmium, copper and/or zinc; even more preferably the heavy metal is cadmium.

Another aspect of the present disclosure provides the use of a polymeric surfactant in the precipitation of heavy metals in a phosphoric acid containing composition with a diorgano-dithiophosphinic acid or an alkali metal or ammonia salt thereof, represented by Formula 1 above, as the heavy metal precipitating agent, wherein the polymeric surfactant is a cationic polymeric surfactant, an anionic polymeric surfactant, or a mixture thereof. In particular, the polymeric surfactant is a cationic copolymer of (meth)acrylamide. More in particular, the polymeric surfactant is a cationic polymer with a cationic charge ranging from 10% to 80%. More in particular, the polymeric surfactant is a copolymer of (meth)acrylamide, particularly a copolymer of (meth)acrylamide and a chloro-methylated monomer, such as dimethylaminoethyl (meth)acrylate.

DETAILED DESCRIPTION OF INVENTION

Before the present system and method of the invention are described, it is to be understood that this invention is not limited to particular systems and methods or combinations described, since such systems and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may be. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those ordinary skilled in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. It is to be understood that other embodiments may be utilised, and structural or logical changes may be made without departing from the scope of the present invention. The following detailed description, therefore, is not to be taken in a limiting sense, and the scope of the present invention is defined by the appended claims. In the present application, the percentages are given by weight, unless otherwise stated.

In the present disclosure, the concentration of the components comprised in a composition, when indicated as a percentage, is given as the percentage by weight with respect to the total weight of the composition, unless otherwise stated.

In the present disclosure, unless otherwise stated, the pH values are measured after a 13 times dilution by volume with water. Stated differently, the pH value is measured after mixing one volume of a non-diluted sample with 13 volumes of water.

In the present disclosure, unless explicitly stated otherwise, the terms "ionic polymer" or "ionic polymeric" as they relate to the flocculating agent or surfactant considered herein, are in the meaning of macromolecules comprising multiple charged or ionic subunits. More specifically, the term "ionic polymer" or "ionic polymeric" as they relate to the flocculating agent or surfactant considered herein is used synonymously for the terms "polyelectrolyte" or "polyelectrolytic", i.e. polymers, in particular polycations or polyanions, whose repeating units bear an electrolyte group.

In the present disclosure, ionic poly(meth)acrylamides, such as cationic or anionic poly(meth)acrylamides are particularly preferred.

The present disclosure provides improved methods for the removal of heavy metals, in particular cadmium, from an aqueous phosphoric acid containing composition, wherein an ionic polymeric surfactant is added together with a heavy metal precipitating agent to a phosphoric acid containing composition. As used herein, the term "heavy metal" generally refers to those elements of the periodic table having a density of more than 5 $g/cm^3$. Such heavy metal (or heavy metal ions) include, for example, one or more of cadmium, copper, nickel, mercury, zinc, arsenic, manganese and lead. The present disclosure is particularly directed for the removal of at least cadmium from compositions containing phosphoric acid. The term "phosphoric acid containing composition" may be any aqueous acidic composition or solution containing unrefined phosphoric acid, digestion slurries, filtered acid, and/or concentrated acid, in particular as further discussed below.

According to one aspect of the present disclosure, a method is disclosed for the removal of heavy metals, in particular cadmium, dissolved in a phosphoric acid containing composition, comprising the steps of
(a) providing a phosphoric acid containing composition comprising dissolved heavy metals, such as cadmium;
(b) precipitating the dissolved heavy metals by adding a heavy metal precipitating agent together with a surfactant to the composition of step (a), at a pH of at least 1.6 measured after a 13-fold dilution by volume using water, thereby obtaining a heavy metal precipitate in a phosphoric acid containing composition, wherein the heavy metal precipitating agent comprises a an organodithiophosphorous acid, in particular a diorgano-dithiophosphinic acid or an alkali metal or ammonia salt thereof; and
(c) separating the heavy metal precipitate from the phosphoric acid containing composition of step (b);
wherein the surfactant is a cationic polymeric surfactant wherein from 20% to 80%, more particularly from 20% to 60%, even more particularly from 20% to 50% of the moieties making up the cationic polymeric surfactant are cationic charged moieties, an anionic polymeric surfactant wherein from 1% to 10% of the moieties making up the anionic polymeric surfactant are anionic charged moieties, or a mixture thereof.

As defined herein, a surfactant is a compound that is added together with the heavy metal precipitating agent, in step (b).

In the context of the present disclosure, the phosphoric acid containing composition from which the heavy metals, in particular cadmium is to be removed, may be obtained by digesting a phosphate rock, a phosphate ore or a phosphate mineral with an acid. Such phosphate rock may contain high amounts of heavy metals, in particular cadmium, e.g. from 10 to 300 mg Cd/kg $P_2O_5$. The acid used in the digesting step may be nitric acid, sulfuric acid or a combination thereof.

In certain embodiments, the phosphoric acid containing composition comprises from 1 to 85 wt % phosphoric acid, particularly from 1 to 60 wt % phosphoric acid, more particularly from 10 to 60 wt %, such as from 20 to 60 wt % phosphoric acid, even more particularly from 10 to 40 wt % phosphoric acid, most particularly from 20 to 35 wt % or from 25 to 30 wt % phosphoric acid, as well as dissolved heavy metals, such as cadmium. The phosphoric acid containing composition may comprise from 1 to 500 mg/l, more in particular from 1 to 250 mg/l, more in particular 1 to 100 mg/l dissolved cadmium.

In certain embodiments, the phosphoric acid containing composition is obtained by digesting a phosphate rock, a phosphate ore or a phosphate mineral with nitric acid at 65° C. In particular, the phosphoric acid containing composition comprises from 18 to 21 weight % nitric acid, from 25 to 29 weight % phosphoric acid and dissolved heavy metals, such as dissolved cadmium. More in particular, the phosphoric acid containing composition is obtained by the nitrophosphate process. More in particular, the phosphoric acid containing composition is the mother liquor obtained in the nitrophosphate process. In the nitrophosphate process, in a first step or digestion step, phosphate rock is digested in nitric acid at a temperature of 65° C., yielding a digestion liquor. In a second step or crystallization step, calcium nitrate tetrahydrate is crystallized out of the digestion liquor yielding a crystal slurry. In a third step or separation step, the crystallized calcium nitrate is separated by a technique such as filtration or centrifugation, resulting in calcium nitrate tetrahydrate crystals being separated from the liquid of the crystal slurry, referred to as the mother liquor.

In certain embodiments, the phosphoric acid containing composition is obtained by a mixed acid process, wherein nitric acid is used for acidulation of a phosphate rock, a phosphate ore or a phosphate mineral. Sulfuric acid is typically added to precipitate the calcium as calcium sulphate (gypsum), which is generally left in the slurry and acts as a diluent. Phosphoric acid may be added in order to adjust the water soluble phosphorous, depending on the grade being produced.

In certain embodiments, the surfactant is a copolymer of acrylamide or methacrylamide. As used herein, the term "ionic acrylamide copolymer", "ionic polyacrylamide", "ionic methacrylamide copolymer" or "ionic polymethacrylamide" refers to a polymer comprising acrylamide or methacryl amide subunits and additionally comprising subunits comprising an ionic charge. Cationic acrylamide copolymers or cationic methacrylamide copolymers comprise subunits having a cationic charge, particularly comprising a quaternary nitrogen atom, such as comprising ADAM or MADAM subunits, i.e. dimethylaminoethyl acrylate or dimethylaminoethyl metacrylate, respectively. Anionic acrylamide copolymers or anionic methacrylamide copolymers comprise subunits having an anionic charge, particularly comprising a carboxylate or sulphonate functional group, such as comprising acrylic acid or methacrylic acid subunits, or styrene sulphonate subunits.

In particular embodiments, the surfactant is a cationic polymer, particularly a cationic (meth)acrylamide copolymer, with a cationic charge ranging from 20% to 60%, particularly ranging from 20% to 50% or from 30% to 50%, more particularly ranging from 35% to 45%.

A particularly preferred cationic surfactant is a copolymer of acrylamide or methacrylamide and a chloro-methylated monomer, such as dimethylaminoethyl methacrylate or dimethylaminoethyl acrylate.

In certain embodiments, the polymeric surfactant has a MW ranging from $3 \times 10^6$ Dalton to $14 \times 10^6$ Dalton, particularly from $4 \times 10^6$ Dalton to $12 \times 10^6$ Dalton, more particularly from $4 \times 10^6$ Dalton to $8 \times 10^6$ Dalton. The surfactant may be a linear molecule or a branched molecule. In certain embodiments, the surfactant is added in a dose of 3 to 30 g/m$^3$ acid composition, particularly in a dose of 3 to 20 g/m$^3$ acid composition, such as in a dose of 5 to 20 g/m$^3$ or 10 to 20 g/m$^3$ acid composition.

In the context of the present disclosure, the organothiophosphorous heavy metal precipitating agent comprises a diorgano-dithiophosphinic acid or an alkali metal or ammonia salt thereof, represented by Formula 1

Formula 1 wherein R is a linear or branched hydrocarbon group selected from alkyl, aryl, alkylaryl, or aralkyl, and wherein the hydrocarbon group contains 3 to 20 carbon atoms, and M is H, alkali metal or ammonia. Preferred examples of the hydrocarbon groups R in the diorgano dithiophosphinic acid (or alkali metal or ammonia salts thereof) according to formula 1 include, but are not limited to, linear or branched alkyl, cycloalkyl, alkylaryl, aralkyl having from 3-20 carbon atoms. More preferably, suitable hydrocarbon groups include, but are not limited to, cyclohexyl, isopropyl, isobutyl, n-propyl, octyl, hexyl, phenylethyl, and 2,4,4-trimethyl pentyl. Even more preferably, the diorgano-dithiophosphinic acid (or salt thereof) used in the present invention as heavy metal precipitation agent is di-isobutyl dithiophosphinate. In a preferred embodiment, the precipitating agent is sodium di-isobutyl dithiophoshinate.

Generally, the heavy metal precipitating agent can be prepared according to the procedure described in U.S. Pat. No. 4,308,214 and the corresponding examples by heating 67.2 parts of sulfur 114.8 to 284.8 parts of water to a temperature of about 70° C. To the mixture are then steadily metered in 29.5 to 64.5 parts of the commercially available di-phosphine. After the di-phosphine has been metered, an additional 67.5 to 193.5 additional parts of diethyl phosphine are metered in at a rate such that within the time necessary to meter in all of the diethylphosphine, 80.0 parts of a 50% solution of sodium hydroxide are also metered in at a constant rate to neutralize the corresponding dithiophosphinic acid that forms.

In certain embodiments, the heavy metal precipitating agent is added in an amount ranging from 10 μg to 1 mg per g of the phosphoric acid containing composition, particularly from 50 μg to 0.75 mg per g of the phosphoric acid containing composition, more particularly ranging from 0.2 to 0.6 mg or from 0.3 mg to 0.6 mg per g of the phosphoric acid containing composition.

In certain embodiments, the weight ratio of precipitating agent to surfactant ranges from 1:1 to 10:1, particularly ranges from 3:1 to 6:1.

In the context of the present disclosure, the heavy metal precipitating agent as envisaged in the present disclosure is added in combination with an ionic polymeric surfactant as envisaged herein. Stated differently, the heavy metal precipitating agent as envisaged herein, particularly the diorgano-dithiophosphinic acid or an alkali metal or ammonia salt thereof represented by Formula 1, and the ionic polymeric surfactant as envisaged herein are added essentially simultaneously or concurrently together to the phosphoric acid containing composition comprising dissolved heavy metals, in particular under vigorous mixing conditions, such as at mixing speeds of 500 to 700 rpm. In certain embodiments, step b) corresponds to precipitating the dissolved heavy metals by adding a blend of a heavy metal precipitating agent and a surfactant to the composition of step (a), at a pH of at least 1.6 measured after a 13-fold dilution by volume using water, particularly under vigorous mixing conditions, for instance at a mixing speed of 500 to 700 rpm, thereby obtaining a heavy metal precipitate in a phosphoric acid containing composition, wherein the heavy metal precipitating agent comprises a an organodithiophosphorous acid, in particular a diorgano-dithiophosphinic acid according to formula 1 above, or an alkali metal or ammonia salt thereof; and wherein the surfactant is a cationic polymeric surfactant wherein from 20% to 80%, more particularly from 20% to 60%, even more particularly from 20% to 50% of the moieties making up the cationic polymeric surfactant are cationic charged moieties, an anionic polymeric surfactant wherein from 1% to 10% of the moieties making up the anionic polymeric surfactant are anionic charged moieties, or a mixture thereof. According to particular embodiments of the present disclosure, cationic polymers, more in particular cationic acrylamide or methacryl amide based copolymers, with an ionic charge ranging from 20% to 60%, such as from 20% to 50%, are especially suitable as polymeric surfactant for use in combination with the heavy metal precipitating agent as envisaged herein. In particular, a polymer of (meth)acrylamide and a chloro-methylated monomer may be used. Examples of suitable cationic polymers include, but are not limited to, 40% linear cationic powder polyacrylamide (that is a polyacrylamide having 40% of its moieties positively charged) with molecular weight ranging from 7.1 to 9.5*$10^6$ Dalton or 20% linear cationic powder polyacrylamide (that is a polyacrylamide having 20% of its moieties positively charged) with molecular weight ranging from 8.7 to 11.0*$10^6$ Dalton.

According to an embodiment of the present disclosure, the reaction with the heavy metal precipitating agent and the surfactant as envisaged herein may be performed for 3 minutes to 1.5 hour, for 5 minutes to one hour, or for 10 to 30 minutes. The skilled person understands that the reaction with the heavy metal precipitating agent and the surfactant as envisaged herein is particularly performed under vigorous mixing conditions, for instance at a mixing speed of 500 to 700 rpm. According to an embodiment of the present disclosure, the reaction with the heavy metal precipitating agent and the surfactant as envisaged herein may be performed at temperature ranging from 5° C. to 80° C., in particular at a temperature from 5° C. to 50° C., more particularly are performed at a temperature of 5° C. to 40° C. As the heavy metal precipitate may be less stable at temperatures above 40° C., it may be desirable to perform the reaction with the heavy metal precipitating agent and the surfactant for less than 10 minutes at higher temperatures.

Figure 1:
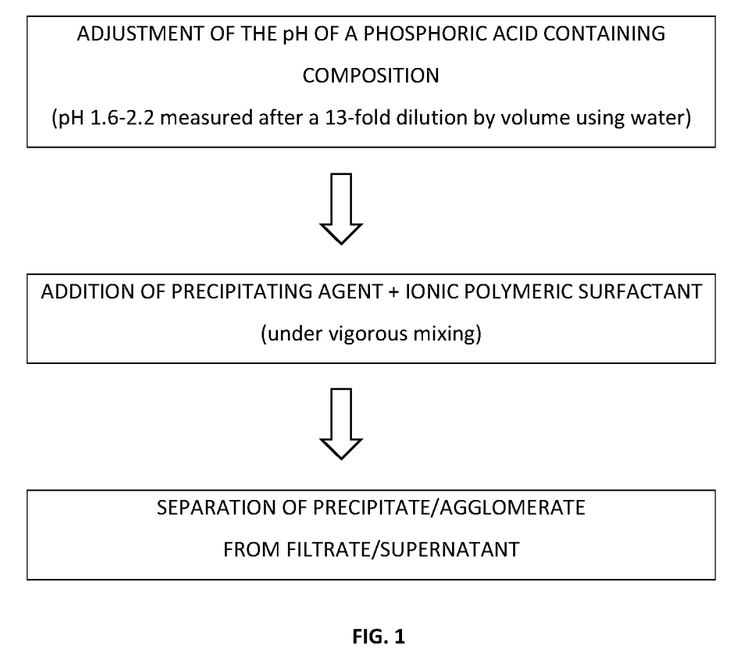
FIG. 1 schematically represents a particular embodiment of the method according to the present disclosure, comprising the steps, in sequence, of adjusting the pH of a phosphoric acid composition to 1.6-2.2 measured after a 13-fold dilution by volume using water, adding a precipitating agent in combination with an ionic polymeric surfactant, and separating the precipitate from the filtrate/supernatant.
Figure 2:
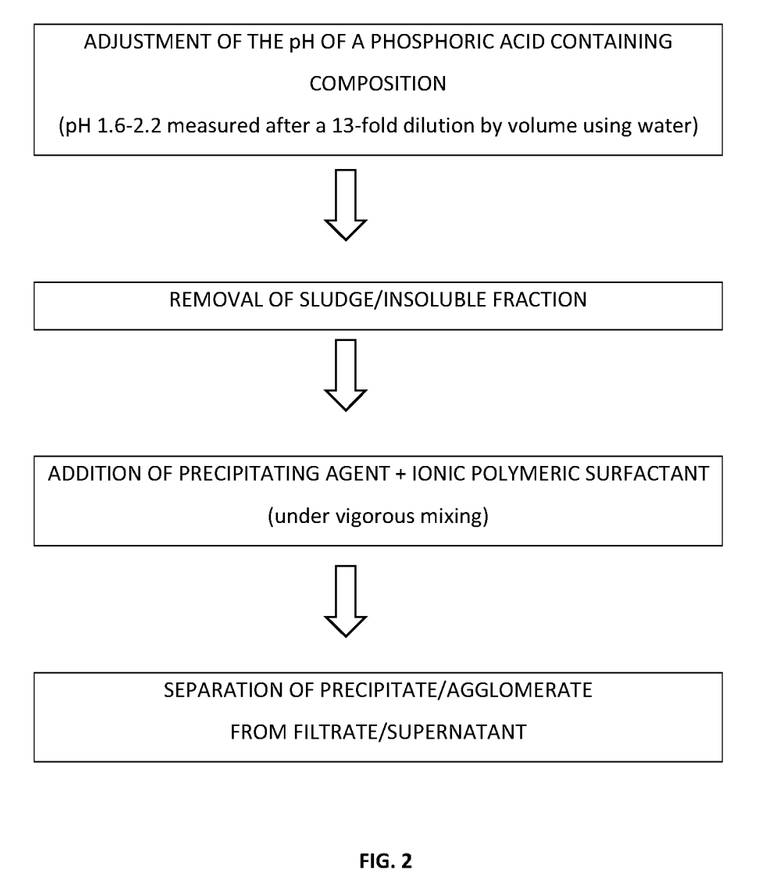
FIG. 2 schematically represents a particular embodiment of the method according to the present disclosure, comprising the steps, in sequence, of adjusting the pH of a phosphoric acid composition to 1.6-2.2 measured after a 13-fold dilution by volume using water, removing a sludge fraction, adding a precipitating agent in combination with an ionic polymeric surfactant and separating the precipitate from the filtrate/supernatant.
Figure 3:
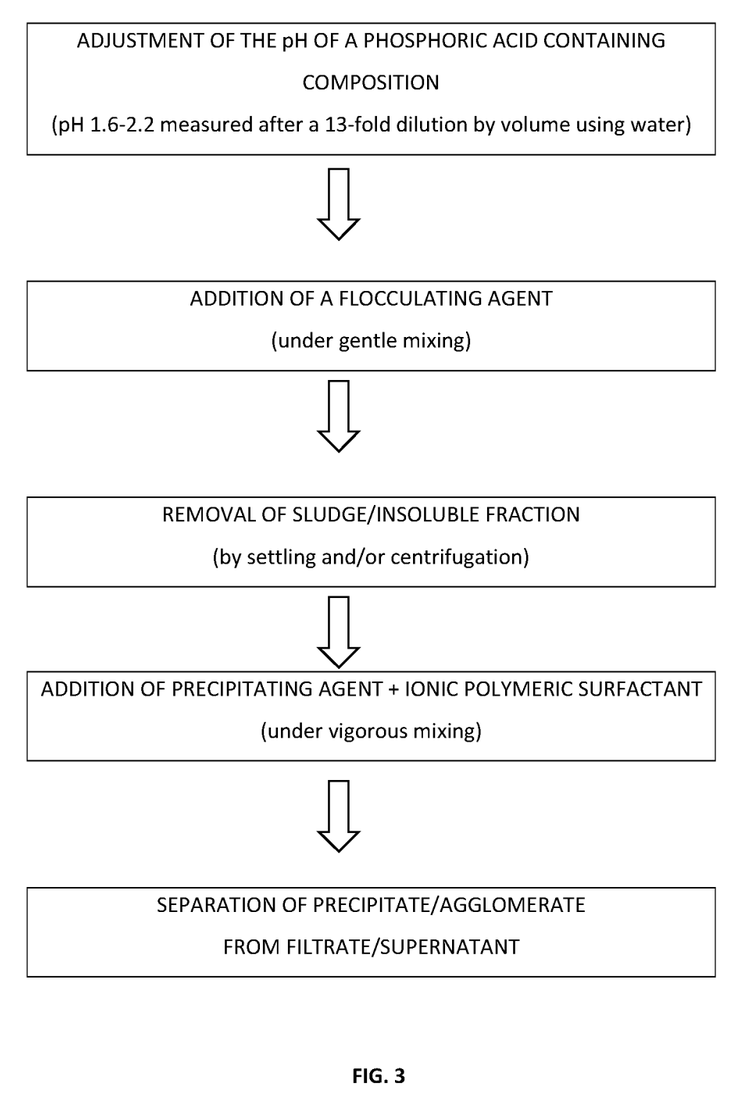
FIG. 3 schematically represents a particular embodiment of the method according to the present disclosure, comprising the steps, in sequence, of adjusting the pH of a phosphoric acid composition to 1.6-2.2 measured after a 13-fold dilution by volume using water, adding a flocculating agent, removing a sludge fraction, adding a precipitating agent in combination with an ionic polymeric surfactant, and separating the precipitate from the filtrate/supernatant.

In certain embodiments, the phosphoric acid containing composition may be subjected to one or more pretreatments, prior to the addition of the precipitating agent and the ionic surfactant, as indicated in FIG. 1, FIG. 2 and FIG. 3. Such pretreatments include pH adjustment (FIG. 1-FIG. 3) and separating an insoluble fraction (sludge) (FIG. 2 and FIG. 3) from the phosphoric acid containing composition.

In certain embodiments, removal of the insoluble fraction (sludge) may comprise the addition of a first flocculating agent to the phosphoric acid containing composition at pH of at least 1.6 to facilitate the separation of the insoluble fraction from the phosphoric acid containing composition (FIG. 3).

In particular, according to an embodiment of the present disclosure, step (a) further comprises the steps of
 (i) adjusting the pH of a phosphoric acid containing composition comprising dissolved heavy metals to a pH of at least pH 1.6, thereby obtaining a phosphoric acid containing composition comprising a sludge fraction;
 (ii) optionally adding a first flocculating agent to the composition of step (i);
 (iii) separating the sludge fraction from the composition of step (i) or (ii).

As defined herein, a first flocculating agent is a compound that is added before step (a)(II).

In the context of present disclosure, the pH of the phosphoric acid containing composition may be adjusted prior to the addition of the heavy metal precipitating agent to a pH of at least 1.6, in particular between 1.6 and 2.2 or between 1.6 and 2.0 (measured after a 13-fold dilution by volume using water), thereby obtaining a phosphoric acid containing composition comprising a sludge fraction. At this pH, heavy metal precipitation, particularly cadmium precipitation, using an organothiophosphorous acid according to Formula 1 as envisaged herein, or an alkali metal or ammonia salt thereof, is especially effective. In addition, at these pH conditions, precipitation of phosphorous salts, in particular dicalcium phosphate (CaHPO$_4$) is minimized, thereby minimizing phosphorous losses and maintaining the content of phosphorous in the phosphoric acid composition and, hence, in the final product. In certain embodiments, the pH of the aqueous phosphoric acid containing composition is adjusted using gaseous ammonia. Advantageously, particularly when the phosphoric acid containing composition comprises nitric acid, no other chemical elements are introduced other than nitrogen and hydrogen already present in the nitric acid, such that a very pure NP-end product may be obtained.

In certain embodiments, at least part of the insoluble components or sludge present in the phosphoric acid containing composition, particularly the phosphoric acid containing composition comprising a sludge fraction, may be removed prior to the addition of the heavy metal precipitating agent and the ionic polymeric surfactant. More in particular, a first flocculating agent may be added to the phosphoric acid containing composition, particularly the phosphoric acid containing composition comprising a sludge fraction, particularly under gentle mixing conditions, such as at mixing speeds of 100 to 300 rpm, to promote the agglomeration and precipitation of the insoluble components or sludge fraction (FIG. 3). Surprisingly, the removal of at least part of the insoluble components or sludge before the addition of the heavy metal precipitating agent and ionic polymeric surfactant did not affect the heavy metal precipitation efficiency of the method. Moreover, the separation of part of the sludge and insoluble components, such as aided by flocculation, prior to heavy metal precipitation, in particular cadmium precipitation, facilitates the cadmium extraction from the composition comprising phosphoric acid. Advantageously, in this way, a smaller amount of the heavy metal precipitating agent as envisaged herein may be added to the phosphoric acid containing composition and the resulting heavy metal containing precipitates comprise a higher concentration of heavy metals, in particular cadmium.

The first flocculating agent may be any flocculating agent suitable for the agglomeration and flocculation of the sludge fraction. In particular embodiments, the first flocculating agent is a cationic polymer wherein 20% to 80%, particularly 20% to 60% or 30% to 50%, more particularly 35% to 45% of the moieties making up the cationic polymeric surfactant are cationic charged moieties, an anionic polymer wherein 10% to 50%, particularly 10% to 40%, more particularly 15% to 30% of the moieties making up the anionic polymeric surfactant are anionic charged moieties, or a mixture thereof. In particular embodiments, the first flocculating agent is a copolymer of acrylamide or methacrylamide. According to particular embodiments of the present disclosure, cationic acrylamide or methacryl amide based copolymers, with a cationic charge ranging from 30% to 50% or from 35% to 45%, are especially suitable for the purpose of agglomerating and separating the sludge and insoluble components prior to the addition of the heavy metal precipitating agent and surfactant. In particular, a polymer of (meth) acrylamide and a chloro-methylated monomer may be used. Examples of suitable cationic polymers include, but are not limited to, 40% linear cationic powder polyacrylamide (that is a polyacrylamide having 40% of its moieties negatively charged) with molecular weight ranging from 7.1 to 9.5*10$^6$ Dalton, 40% linear cationic powder polyacrylamide (that is a polyacrylamide having 40% of its moieties negatively charged) with molecular weight ranging from 4.8 to 7.6*10$^6$ Dalton, or 40% linear cationic powder polyacrylamide with molecular weight ranging from 9.5 to 12.1*10$^6$ Dalton. According to particular embodiments of the present disclosure, anionic acrylamide or methacrylamide based copolymers, with a anionic charge ranging from 1 to 10%, are especially suitable for the purpose of agglomerating and separating both the sludge and insoluble components prior to the addition of the heavy metal precipitating agent, as well as the heavy metal precipitates formed after addition and mixing of the heavy metal precipitating agent to the phosphoric acid containing composition. In particular, a polymer of (meth)acrylamide and (meth)acrylic acid may be used. Examples of suitable anionic polymers include, but are not limited to linear anionic emulsion polyacrylamide with molecular weight ranging from 9.7 to 17.5*10$^6$ Dalton or linear anionic powder polyacrylamide with molecular weight ranging from 12.2 to 17.5*10$^6$ Dalton.

The separation of the sludge may be accomplished by any standard technology for separation such as, but not limited to, filtration, centrifugation, sedimentation, flotation or decantation. In certain embodiments, the separation of the precipitated insoluble or sludge fraction due to the addition of the first flocculating agent is performed by centrifugation. In particular embodiments, the precipitated insoluble or sludge fraction is subject to a pre-concentration step prior to centrifugation, wherein at least part of the liquid is separated from the precipitated sludge fraction. For instance, such pre-concentration step may be a settling step, wherein the sludge agglomerates settle, so that the liquid can be separated, such as by decantation, prior to centrifugation. Advantageously, this way, the amount of the composition to be centrifuged, particularly the amount of liquid, is reduced and the centrifugation step is rendered more efficient, as the solids/liquid separation in the centrifugation is more easily achieved.

Accordingly, in particular embodiments, a method is provided for the removal of heavy metals dissolved in a phosphoric acid containing composition, wherein the method comprises the steps of (a)(i) providing a phosphoric acid containing composition comprising dissolved heavy metals, such as cadmium, and adjusting the pH of a phosphoric acid containing composition comprising dissolved heavy metals to a pH of at least pH 1.6, in particular a pH of 1.6 to 2.0 or pH 1.6 to 2.2, thereby obtaining a phosphoric acid containing composition comprising a sludge fraction;

(a)(ii) adding a first flocculating agent, particularly an ionic polymeric flocculating agent as envisaged herein, to the composition of step (a)(i), thereby obtaining sludge agglomerates, and, optionally, removing part of a liquid fraction;

(a)(iii) removing the sludge agglomerates from the composition of step (a)(ii), particularly by centrifugation;

(b) precipitating the dissolved heavy metals by adding a heavy metal precipitating agent together with an ionic polymeric surfactant as envisaged herein, particularly a cationic polymeric surfactant, to the composition of step (a), at a pH of at least 1.6, in particular a pH of 1.6 to 2.0 or pH 1.6 to 2.2, thereby obtaining a heavy metal precipitate in a phosphoric acid containing composition, wherein the heavy metal precipitating agent comprises an diorgano-dithiophosphinic acid according to Formula 1 as envisaged herein, or an alkali metal or ammonia salt thereof; and (c) separating the agglomerates comprising the heavy metal precipitate from the phosphoric acid containing composition of step (b), particularly by centrifugation.

According to an embodiment of the present disclosure, the precipitation step (b) and/or flocculation step (a)(ii) are performed at a temperature of 5° C. to 50° C., particularly are performed at a temperature of 5° C. to 40° C. Particular good results were obtained at a temperature ranging from 10° C. to 35° C. or 10 to 30° C. These temperatures in combination with the above indicated pH conditions of 1.6 to 2.0, benefit the stability of the heavy metal precipitating agent in the phosphoric acid containing composition as envisaged herein. These conditions were also found to be optimal for flocculation and precipitation of the non-phosphate insoluble or sludge fraction in the phosphoric acid containing composition comprising a sludge fraction. Certain embodiments of the present disclosure include adjusting the temperature of the phosphoric acid containing composition to a temperature of 5° C. to 50° C., particularly to a temperature of 5° C. to 40° C., more particularly to a temperature of 10° C. to 35° C. or 10° C. to 30° C., by natural cooling or by heat exchangers.

In the context of the present disclosure, the separation in step c) or step a)(iii) may be accomplished by state of the art technology for liquid-solid separation such as, but not limited to, centrifugation and/or decantation. Separation by centrifugation is particularly preferred. Although some of the agglomerates have been found to be quite fragile, separation of the flocculants by centrifugation was surprisingly effective. In addition, in certain embodiments, the separation of the heavy metal precipitates formed and obtained in step b) may be promoted by the addition of a second flocculating agent. As defined herein, a second flocculating agent is a compound that is added after the heavy metal precipitating agent is added to the composition after step (b) and during the separating step (c). The second flocculating agent may be any flocculating agent suitable for the agglomeration and flocculation of the heavy metal precipitates. The second flocculating agent may be the same or different than the first flocculating agent. In particularly preferred embodiments, the second flocculating agent is a compound according to the ionic polymeric surfactant as described herein.

Another aspect of the present disclosure provides a method for preparing a fertilizer, particularly a nitrogen fertilizer, comprising the steps of
Digesting phosphate rock with nitric acid, thereby obtaining a composition comprising phosphoric acid and calcium nitrate;
Removing heavy metals from the composition comprising phosphoric acid according to any embodiment of the methods envisaged herein; in particular comprising the steps of optionally removing a sludge fraction by flocculation with a first flocculating agent and precipitation; precipitating the dissolved heavy metals, such as cadmium, by adding a heavy metal precipitating agent in combination with an ionic polymeric surfactant, in particular a cationic polymeric surfactant, an anionic polymeric surfactant, or a mixture thereof, to the phosphoric acid containing composition, at a pH of at least 1.6, particularly under vigorous mixing conditions, such as at mixing speeds of 500 to 700 rpm, wherein the heavy metal precipitating agent comprises a diorgano-dithiophosphinic acid according to formula 1 or an alkali metal or ammonia salt thereof; and separating the heavy metal precipitates from the phosphoric acid containing composition.
Further adjusting the pH of the phosphoric acid containing composition to approximately pH 5.8 using gaseous ammonia;
optionally, adding potassium salts to the phosphoric acid containing composition with pH 5.8;
particulating the phosphoric acid containing composition with pH 5.8 and optionally comprising potassium salts, and, further, optionally, coating and/or coloring the particles.

In this manner, it is possible to obtain, from the nitro-phosphate process, coated or non-coated, colored on non-colored NP or NPK particles with reduced amounts of heavy metals, such as cadmium. It will be evident to the person skilled in the art that the method of the disclosure can be applied on the total aqueous composition resulting from the digestion step or only on part of the digestion liquor. In the latter case, the part of the digestion liquor which is not treated according to a method of the present disclosure is mixed with or diluted with the part of the digestion liquor which has been treated according to a method of the present disclosure, such that the heavy metal (cadmium) levels of the combined composition is below a desired value, particularly remains within the regulatory limits.

Another aspect of the present disclosure provides for the use of an ionic polymeric surfactant as envisaged in the present disclosure, in the precipitation of heavy metals in a phosphoric acid containing composition with a diorgano-dithiophosphinic acid or an alkali metal or ammonia salt thereof, represented by Formula 1 above, as the heavy metal precipitating agent.

EXAMPLES

Example 1—Effect of a Cationic Polymeric Surfactant

The pH of a cadmium-containing mother liquor (ML), freshly produced from the Odda nitro-phosphate process, was adjusted to pH=1.8 using gaseous ammonia ($NH_3$). The pH was measured after mixing one volume of a non-diluted sample with 13 volumes of water.

The used mother liquor comprised 5.14 wt % Ca (as measured by Atomic Absorption Spectroscopy), 7.4 wt % P (as measured by gravimetry P), 34.2 wt % $H_2O$ (as measured by Karl Fisher titration) and 6 ppm Cd, 15.2 ppm Cu (as measured by ICP-OES). It is understood that the percentages and amounts as they relate to the ML composition are merely an indication of such composition and are not limiting for the process considered herein.

The resulting composition was centrifuged for (2440 rpm, 2 min, 1000 G) to reduce the amount of sludge.

Sodium diisiobutyl dithiophosphinate (DTPINa 3.56%, 0.336 g) was added to the resulting NP-liquor (pH=1.8, 60 g) under vigorous stirring (600 rpm). Simultaneously with the addition of DTPINa, a cationic polyacrylamide copolymer as surfactant was added under intense stirring (40% linear cationic powder polyacrylamide (that is a polyacrylamide having 40% of its moieties positively charged) with a molecular weight ranging from 7.1 to $9.5*10^6$ Dalton, 0.1 wt % concentration, 0.078 g, 600 rpm). The mixture stirred for a total of 3 min. Next, the resulting composition was centrifuge for (2440 rpm, 2 min, 1000 G) and the supernatant and precipitate were separated. In addition, a sample of the composition was taken using a syringe with 5 μm filter. This was to investigate the effect of separation efficiency using a centrifuge. The cadmium and heavy metal content were analyzed by ICP-OES (Thermo Scientific, iCAP 7400 Duo, wavelength: 226.502 nm (Cd) and 204.379 nm (Cu) in an axial mode).

The combination of DTPINa and the cationic polyacrylamide copolymer surfactant resulted in a Cd- and Cu-extraction efficiency of about 85% following centrifugation or filtration. This demonstrates the very efficient removal of the heavy metal containing precipitate by centrifugation.

Example 2—Comparative Example: Cd Precipitation Without Surfactant

The pH of a freshly produced cadmium-containing mother liquor (composition as in example 1) was adjusted to pH=1.8 (measured after a 13-fold dilution by volume using water) using gaseous ammonia ($NH_3$). The resulting composition was centrifuged for (2440 rpm, 2 min, 1000 G)

DTPINa (3.56%, 0.336 g) was added to the mother liquor at pH=1.8 (60 g) under vigorous stirring (600 rpm). After 3 min of reaction the mixture, the resulting composition was centrifuged for (2440 rpm, 2 min, 1000 G) and the supernatant and precipitate were separated. In addition, a sample of the composition was taken using a syringe with 5 μm filter. The cadmium and heavy metal content were analyzed by ICP-OES (Thermo Scientific, iCAP 7400 Duo, wavelength: 226.502 nm (Cd) and 204.379 nm (Cu) in an axial mode).

The addition of DTPINa without a surfactant resulted in a Cd-extraction efficiency of about 73%, Cu-extraction efficiency of about 78%.

Example 3—Effect of Different Charged Polymeric Surfactants

Different surfactants were screened in combination with 200 ppm DTPINa as precipitation agent, using the experimental setup as in Example 1. The tested surfactants include cationic polyacrylamide (PAM) copolymers with charge of 20% linear cationic powder polyacrylamide (that is a polyacrylamide having 20% of its moieties positively charged) with molecular weight ranging from 8.7 to 11.0*$10^6$ Dalton, 40% linear cationic powder polyacrylamide (that is a polyacrylamide having 40% of its moieties positively charged) with molecular weight ranging from 7.1 to 9.5*$10^6$ Dalton or 80% linear cationic powder polyacrylamide (that is a polyacrylamide having 80% of its moieties positively charged) with molecular weight ranging from 5.0 to 7.1*$10^6$ Dalton, anionic polyacrylamide copolymers with charge of 3% linear anionic powder polyacrylamide (that is a polyacrylamide having 3% of its moieties negatively charged) with molecular weight ranging from 13.4 to 16.0*$10^6$ Dalton), 20% linear anionic powder polyacrylamide (that is a polyacrylamide having 20% of its moieties negatively charged) with molecular weight ranging from 12.2 to 17.5*$10^6$ Dalton or 50 mole % linear anionic powder polyacrylamide (that is a polyacrylamide having 50% of its moieties negatively charged) with molecular weight ranging from 11.3 to 22.2*$10^6$ Dalton, a non-ionic PAM surfactant linear powder polyacrylamide (that is a polyacrylamide uncharged) with molecular weight ranging from 8.5 to 12.0*$10^6$ Dalton and dioctyl sulfosuccinate. The results are presented in Table 1.

TABLE 1

Cd and Cu extraction efficiency of different surfactants in combination with DPTINa (200 ppm) with separation of the precipitate by centrifugation

| Surfactant | Cd extraction (%) | Cu extraction (%) |
| --- | --- | --- |
| 20 mole % linear cationic powder polyacrylamide with molecular weight ranging from 8.7 to 11.0 *$10^6$ Dalton | 84 | 88 |
| 40 mole % linear cationic powder polyacrylamide with molecular weight ranging from 7.1 to 9.5 *$10^6$ Dalton | 85 | 85 |
| 80 mole % linear cationic powder polyacrylamide with molecular weight ranging from 5.0 to 7.1 *$10^6$ Dalton | 68 | 77 |
| 80 mole % linear cationic powder polyacrylamide with molecular weight ranging from 5.0 to 7.1 *$10^6$ Dalton | 39 | 46 |
| 20 mole % linear anionic powder polyacrylamide with molecular weight ranging from 12.2 to 17.5 *$10^6$ Dalton | 19 | 29 |
| 50 mole % linear anionic powder polyacrylamide with molecular weight ranging from 11.3 to 22.2 *$10^6$ Dalton | 25 | 65 |
| 50 mole % linear anionic powder polyacrylamide with molecular weight ranging from 11.3 to 22.2 *$10^6$ Dalton | 23 | 37 |
| Dioctyl sulfosuccinate | 27 | 41 |

The present results show that PAM surfactants are suitable alternatives for dioctyl sulfosuccinate (in combination with DTPINa as precipitation agent) for the removal of heavy metals in phosphoric acid containing compositions. Surprisingly, the Cd and Cu removal of the combined/simultaneous use of DTPINA (200 ppm) as precipitating agent and cationic polymers having 20-80% of their moieties positively charged, as surfactants, under vigorous stirring conditions (600 rpm or in the range of 500-70 ppm and with removal of the precipitates by centrifugation) resulted in the highest heavy metal efficiency (67-84%), compared to the use of other polyacrylamide polymers or dioctyl sulfosuccinate as surfactant. With anionic polyacrylamides, only 19-39% of Cd and 29-65% of Cu were removed. A similar low removal efficiency for Cd and Cu was obtained with the non-ionic PAM and with dioctyl sulfosuccinate. For the anionic and non-ionic polyacrylamide and dioctyl sulfosuccinate surfactants, the removal efficiency could be increased by using a 5 μm nylon filter for the separation of the heavy metal precipitates (e.g. to 44-66% (Cd) for the anionic and non-ionic polyacrylamides and 63% for dioctyl sulfosuccinate), but it generally remained inferior to the removal efficiency with the cationic polyacrylamides.

Cationic polymers used as surfactant thus were found to be particularly effective in removing heavy metals (in combination with DTPINa), using centrifugation as a separation technique, without the need for an (additional) filtration step.

Example 4—Effect of Using Another Mother Liquor

The pH of a cadmium-containing mother liquor (ML), freshly produced from the Odda nitro-phosphate process, was adjusted to pH=1.8 using gaseous ammonia ($NH_3$). The pH was measured measured after mixing one volume of a non-diluted sample with 13 volumes of water.

The used mother liquor comprised 6.52 wt % Ca (as measured by Atomic Absorption Spectroscopy), 11.6 wt % P (as measured by gravimetry P), 34.78 wt % $H_2O$ (as measured by Karl Fisher titration) and 3.5 ppm Cd, 12.3 ppm Cu, 97.4 ppm Zn (as measured by ICP-OES). It is understood that the percentages and amounts as they relate to the ML composition are merely an indication of such composition and are not limiting for the process considered herein.

The resulting composition was centrifuged for (2440 rpm, 2 min, 1000 G) to reduce the amount of sludge.

Sodium diisiobutyl dithiophosphinate (DTPINa 3.56%, 0.34 g) was added to the resulting NP-liquor (pH=1.8, 60 g) under vigorous stirring (600 rpm). Simultaneously with the addition of DTPINa, a cationic polyacrylamide copolymer as surfactant was added under intense stirring (40% linear cationic powder polyacrylamide (that is a polyacrylamide having 40% of its moieties positively charged) with a molecular weight ranging from 7.1 to $9.5*10^6$ Dalton, 0.1 wt % concentration, 0.078 g, 600 rpm). The mixture was stirred for a total of 3 min. Next, the resulting composition was centrifuged for (2440 rpm, 2 min, 1000 G) and the supernatant and precipitate were separated. In addition, a sample of the composition was taken using a syringe with 5 μm filter. This was to investigate the effect of separation efficiency using a centrifuge. The cadmium and heavy metal content were analyzed by ICP-OES (Thermo Scientific, iCAP 7400 Duo, wavelength: 226.502 nm for Cd and 204.379 nm for Cu in an axial mode).

The combination of DTPINa and the cationic polyacrylamide copolymer surfactant resulted in a Cd-efficiency of about 50%, Cu-extraction efficiency of 62% and Zn-extraction efficiency of 23% following centrifugation or filtration.

We claim:

1. A process for the removal of heavy metals from a phosphoric acid containing composition, comprising the steps of:
   (a) providing a phosphoric acid containing composition comprising dissolved heavy metals;
   (b) precipitating the dissolved heavy metals by adding a heavy metal precipitating agent and a surfactant having a molecular weight of $4\times10^6$ Dalton to $8\times10^6$ Dalton, to the composition of step (a), at a pH of 1.6 to 2.2, thereby obtaining a heavy metal precipitate in a phosphoric acid containing composition, wherein the heavy metal precipitating agent comprises a diorgano-dithiophosphinic acid or an alkali metal or ammonia salt thereof, represented by Formula 1:

Formula 1 wherein R is a linear or branched hydrocarbon group selected from alkyl, aryl, alkylaryl, or aralkyl, and wherein the hydrocarbon group contains 3 to 20 carbon atoms, and M is H, alkali metal or ammonia; and
   (c) separating the heavy metal precipitate from the phosphoric acid containing composition of step (b),
   wherein the surfactant is a cationic polymeric surfactant wherein from 20% to 80% of the moieties making up the cationic polymeric surfactant are cationic charged moieties, an anionic polymeric surfactant wherein from 1% to 10% of the moieties making up the anionic polymeric surfactant are anionic charged moieties, or a mixture thereof, and
   the phosphoric acid containing composition is an acidic aqueous composition comprising from 6-21 wt % nitric acid, from 25 to 33 wt % phosphoric acid, from 3.5 to 5 wt % calcium and dissolved heavy metals, with wt % based on the total weight of the composition.

2. The process according to claim 1, wherein the surfactant is a (meth) acrylamide based anionic polymer, a (meth) acrylamide based cationic polymer, or a mixture thereof.

3. The process according to claim 2, wherein the surfactant is a copolymer of (meth) acrylamide and a chloromethylated monomer.

4. The process of claim 3 wherein the surfactant is dimethylaminoethyl (meth)acrylate.

5. The process according to claim 1, wherein the surfactant is added in a dose of 3 to 30 g/m³ acid composition.

6. The process of claim 5 wherein the dose is 3 to 20 g/m³ acid composition.

7. The process according to claim 1, wherein the weight ratio of precipitating agent to surfactant ranges from 1:1 to 10:1.

8. The process of claim 7 wherein the weight ratio of precipitating agent to surfactant ranges from 3:1 to 6:1.

9. The process according to claim 1, wherein step (a) further comprises the steps of
   (i) adjusting the pH of a phosphoric acid containing composition comprising dissolved heavy metals to a pH of 1.6 to 2.2; thereby obtaining a phosphoric acid containing composition comprising a sludge fraction;
   (ii) optionally adding a first flocculating agent to the composition of step (i); and
   (iii) separating the sludge fraction from the composition of step (i) or (ii).

10. The process of claim 9 wherein the pH of the phosphoric acid containing composition is adjusted by the addition of ammonia.

11. The process according to claim 1, wherein step (c) comprises the steps of:
   (c1) adding a second flocculating agent to the composition obtained in step (b), thereby obtaining agglomerates comprising the heavy metal precipitate in a phosphoric acid composition; and
   (c2) separating the agglomerates comprising the heavy metal precipitate from the phosphoric acid containing composition.

12. The process according to claim 1 wherein the phosphoric acid containing composition is an acid digest of phosphate rock.

13. The process of claim 12 wherein the phosphate rock is digested by nitric acid, or a mixture of sulfuric acid and nitric acid.

14. The process according to claim 1, wherein R in Formula 1 is selected from the group consisting of cyclohexyl, isopropyl, isobutyl, n-propyl, octyl, hexyl, phenylethyl and 2,4,4-trimethylpentyl.

15. The process of claim 14 wherein the heavy metal-precipitation agent is sodium diisobutyldithiophosphinate.

16. The process according to claim 1, wherein the heavy metals are selected from cadmium, copper, nickel, lead, zinc and/or mercury.

17. The process of claim 16 wherein the heavy metals are selected from cadmium, copper, and/or zinc.

18. The process of claim 17 wherein the heavy metal is cadmium.

19. The process of claim 1 wherein from 20% to 60% of the moieties making up the cationic polymeric surfactant are cationic charged moieties.

20. The process of claim 1 wherein the dissolved heavy metal is cadmium.

\* \* \* \* \*